July 21, 1970 A. VACCARO 3,521,205
SELECTOR SWITCHING MECHANISM
Filed May 9, 1968 3 Sheets-Sheet 1
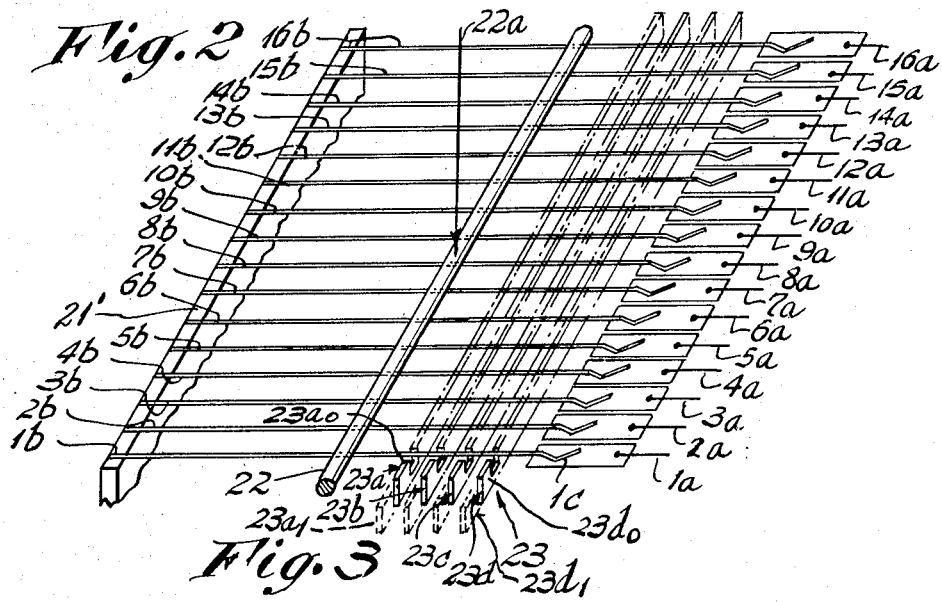
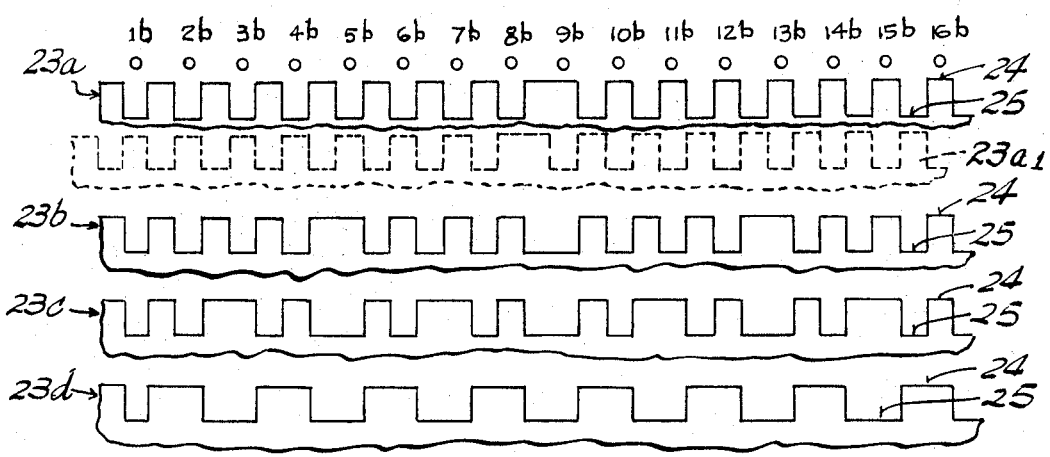
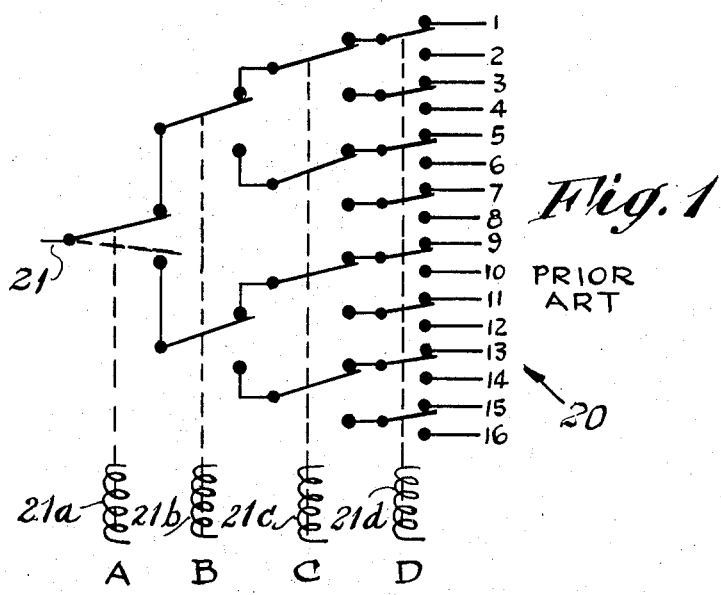
INVENTOR.
Angelo Vaccaro
BY
Johnson and Kline
ATTORNEYS July 21, 1970            A. VACCARO            3,521,205
SELECTOR SWITCHING MECHANISM
Filed May 9, 1968            3 Sheets-Sheet 2
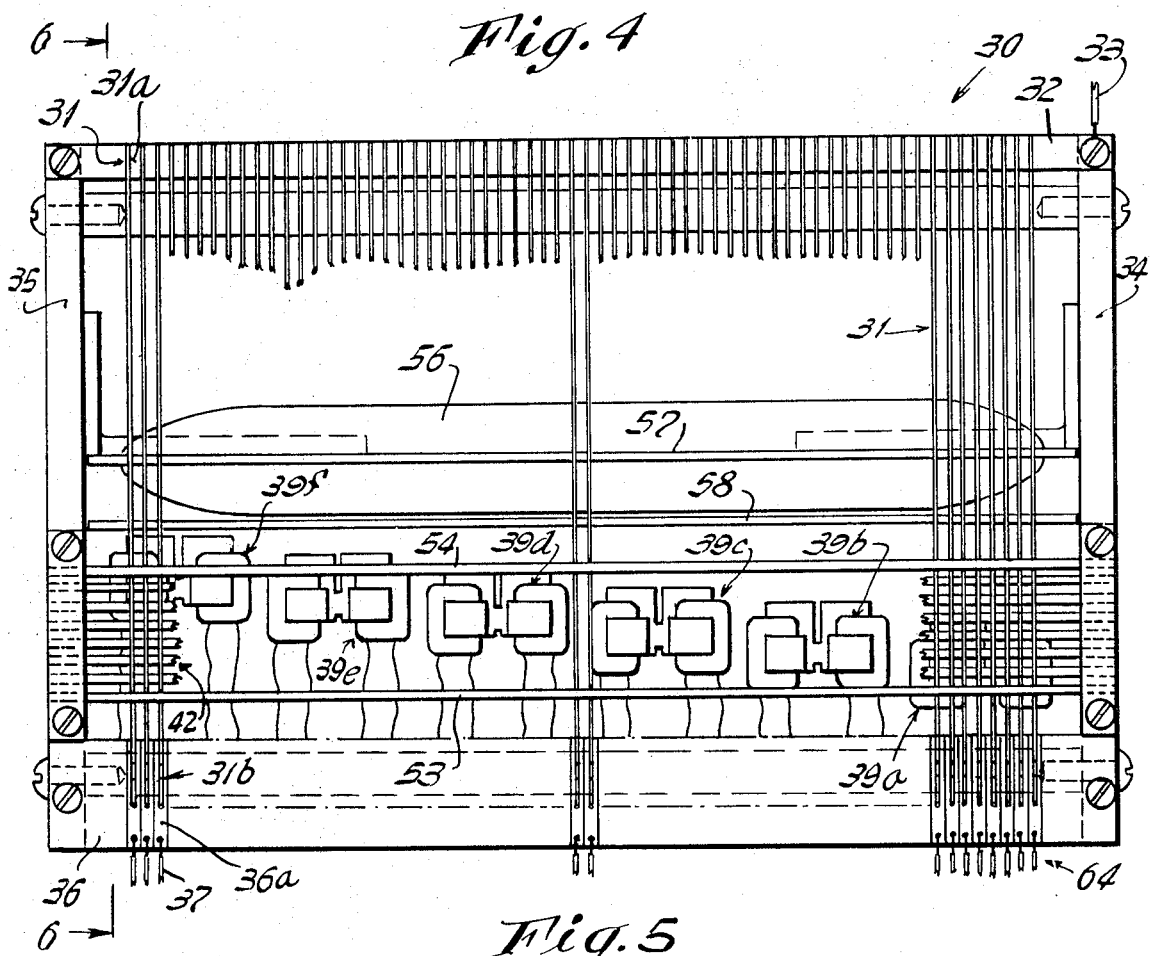
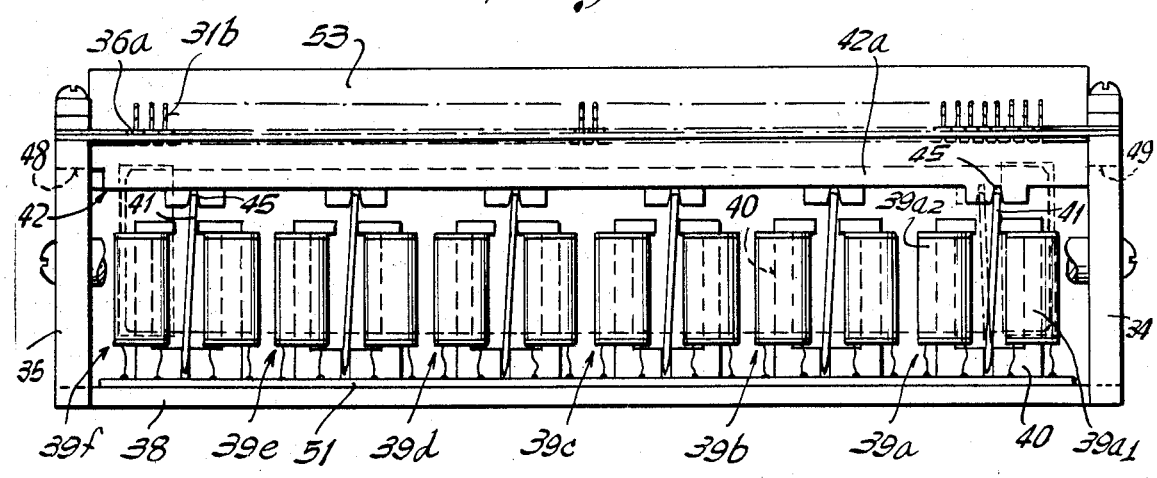
INVENTOR.
Angelo Vaccaro
BY
Johnson and Kline
ATTORNEYS

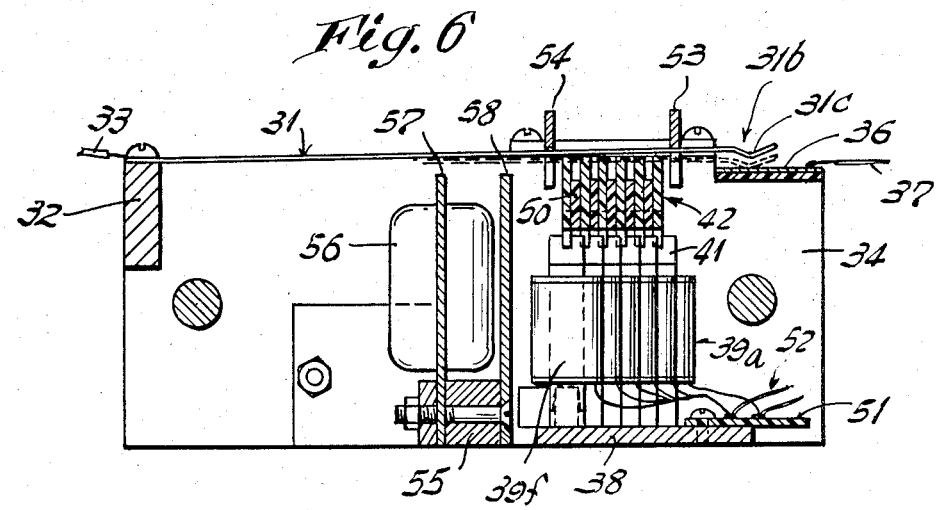
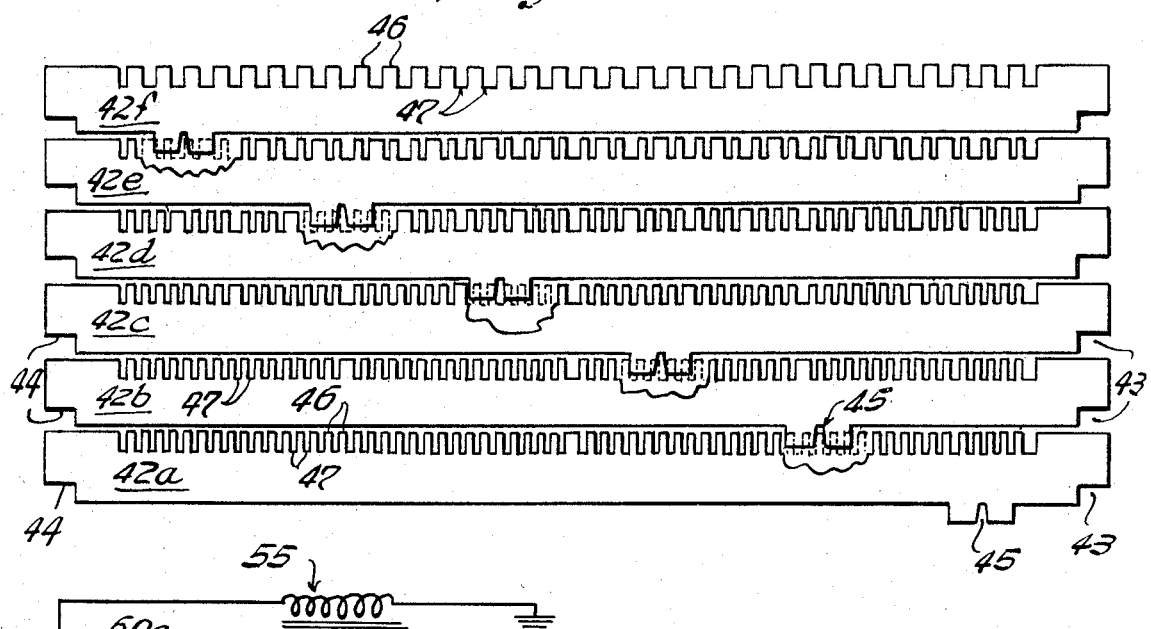
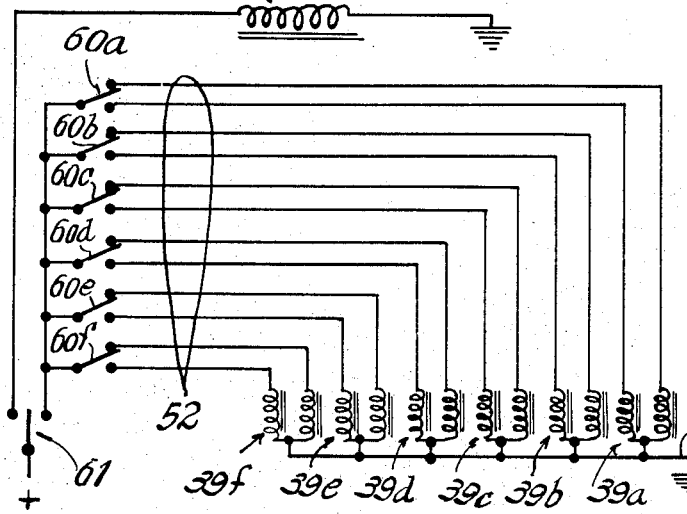

# United States Patent Office 3,521,205
Patented July 21, 1970

3,521,205
SELECTOR SWITCHING MECHANISM
Angelo Vaccaro, Port Washington, N.Y., assignor to Columbia Controls Research Corporation, Glen Cove, N.Y., a corporation of New York
Filed May 9, 1968, Ser. No. 727,959
Int. Cl. H01h 67/04
U.S. Cl. 335—108                                11 Claims

ABSTRACT OF THE DISCLOSURE

A selector switching mechanism having an input and a plurality of outputs in which the input is electrically connected to only the one desired output, with the latter being selected by binary operation of a plurality of restrictors, each of which blocks a different combination of output connections so that only the one desired output is the output that is not blocked by one or more restrictors.

---

The switching mechanism herein disclosed is essentially similar in function to a binary relay tree of the type that has a plurality of sequential stages with the input stage consisting of a single pole relay and the number of poles in subsequent stages increasing in number according to a geometric progression with a ratio of 2, namely $2^{(n+1)}$. By altering the position of the poles of each stage, by either an energized state or a deenergized state of a coil connected to all of the poles of each stage, the input may be connected to any one and only the one of the plurality of outputs. Each output has a different combination of energization and deenergization of the stages unique to it and is selected to be the one output by effecting its unique states of the stages.

While a relay tree has been found to function to produce the connection to the selected output in response to an electrical signal to the coils, it has not been found to be completely satisfactory. Generally the deficiencies are attributable to the number of outputs required and as the outputs increase in number, the deficiencies become magnified. In a binary tree, the number of outputs increases in accordance with the progression with the number of stages required being the power of 2 which numerically equals the number of outputs, and thus many stages may be required with the consequent expense of not only the stages but also of the interconnections therebetween. Moreover, as the number of stages increases, the number of poles which each coil must operate accordingly must increase with there being a mechanical limitation thereon, both as to physical construciton and operable dependability.

It is accordingly an object of the present invention to provide a selector switching mechanism which is responsive to electrical commands to electrically interconnect an input to the one selected output of a plurality of outputs which corresponds to the electrical command with the command being unique to the selected output.

Another object of the present invention is to provide a selector switching mechanism which may have a large number of outputs but yet which is extremely economical to manufacture and reliable in use.

A further object of the present invention is to provide a selector switching mechanism which is extremely simple in construction and irrespective of the number of outputs does not substantially alter the effort required to translate the electrical command to effect the selection of the desired output.

In carrying out the present invention there is provided, as in a relay tree, a single input and a plurality of outputs. The outputs are individually electrically isolated and are engaged by one end of a pole with there being as many poles as outputs. The other ends of the pole are fastened together to the input to be electrically connected in parallel therewith. Each of the poles is movable between a position wherein it is disengaged from its associated output to a position wherein it is engaged and thus electrically connected thereto. In the hereinafter disclosed embodiment of the invention, the poles are normally inherently positioned away from their contacts to an open circuit position but may, upon urging, and as selected, be moved to engage their associated contacts to provide the electrical connection between the input and the selected output.

When it is desired to connect an input to the selected output all the poles are urged, as by a mechanical or magnetic force, from their open position towards their closed position. Positioned in the path of movement of the poles is a restriction means which when engaged by a pole prevents the urging of the pole from assuming its closed position with its associated output. However, the restriction means is in the form of a plurality of restrictors that are coded with restricting portions and unrestricting portions such that in all positions of the restriction means, there will be at least one pole which is aligned with unrestricting portions and hence may move under the urging of the urging means to engage its associated contact. All the other poles will be aligned with at least one restricting portion and hence be prevented from engaging their contacts. The restriction means is constructed to respond to electrical commands to select the pole which is to be aligned with the unrestricting portions and hence by shifting the position of the unrestricting portions, the one output that is selected will become closed.

Other features and advantages will hereinafter appear.

In the drawing:

FIG. 1 is a sechematic diagram of a prior art binary relay tree.

FIG. 2 is a diagrammatic representation of the selector switching means of the present invention.

FIG. 3 is a representation of the restricting and unrestricting portions of the restriction means.

FIG. 4 is a plan (partially broken away) of an embodiment of the present invention having 64 possible outputs.

FIG. 5 is a front view thereof.

FIG. 6 is a vertical section taken on the line 6—6 of FIG. 4.

FIG. 7 is a view of the parts of the restriction means of the present invention.

FIG. 8 is an electrical schematic diagram.

Referring to the drawing, the selector switching mechanism of the present invention has especial utility as a replacement for a relay tree of the binary type such as shown schematically in FIG. 1 and indicated by the reference numeral 20. Such a relay tree has an input 21 and sixteen individual outputs 1–16 requiring, as it is a binary, four stages A, B, C and D. Each stage has its own coil or solenoid 21a, 21b, 21c and 21d respectively for effecting the shifting from its spring urged one state to its coil energized other state upon receipt of an electrical command. In the state or position shown herein, all the coils are deenergized and the input is connected through the poles in each stage to output 1.

By different energization and nonenergization of the coils, the input may be connected to any one of the other outputs. For example, if all the coils were energized the input would be connected to the output 16; if only relay coil 21c was energized the output 3 would be connected to the input 21. Accordingly in such a tree the output that is connected to the input is determined by the electrical commands which serve to energize the coils 21a–21d.

The present invention, as diagrammatically represented in FIG. 2, similarly has the sixteen outputs $1a$–$16a$ and an input $21'$. Each of the outputs $1a$–$16a$ is essentially a flat rectangular piece of conducting material and is electrically isolated from every other output. Extending between the input $21'$ and the outputs is a plurality of poles (sixteen) $1b$–$16b$, there being one pole for each output. Each pole has an end connected mechanically and electrically to the input $21'$ while its other end is shaped to form a contact, such as the shape $1c$ of the pole $1b$. The poles are all identical in shape, evenly spaced to be in alignment with the outputs, made of electrically conducting though somewhat resilient material and are normally constructed so that the contact portion of each, i.e. $1c$, is spaced from its associated output such as the output $1a$ is spaced from the pole $1b$. Thus, in the position shown, there is an open connection between the poles and the contacts.

If a force is applied as through a member 22 to all the poles in the direction of the arrow $22a$ all poles will be urged to a position where they could engage their respective outputs as they would bend by reason of their being cantilevers. It will be understood that each of the poles is only movable in a vertical plane and by each being in alignment with an output is only engageable with its associated output though movable between an opened and closed position with respect thereto.

In accordance with the present invention, even though all the poles are urged from an open to a closed position by the member 22 only a selected pole is permitted to so move to its closed position. The selection is made by a restriction means, generally indicated by the reference numeral 23 positioned underneath the poles to be opposite to the force $22a$. The restriction means in the embodiment shown includes four restrictors $23a$–$23d$ consisting of a thin rigid sheet that has a sufficient length to span the row of poles. The restrictors are mounted for individual movement transverse to the poles.

The upper surface of each restrictor is shown in FIG. 3 together with its relationship with the poles $1b$–$16b$, it being appreciated that the positions of the restrictors are in vertical alignment with the poles, but for convenience are vertically displaced rather than horizontally displaced as shown in FIG. 2. Each of the restrictors is formed to have portions which restrict the movement of a pole and portions which do not restrict the movement to a closed position. The restricting portions consists of the uppermost top edges of the restrictor with some restricting portions being indicated by the reference numeral 24 while the unrestricting portions are defined by a slot formed in the upper edge with some being indicated by the reference numeral 25. The restrictors $23a$–$23d$ are positioned with respect to the poles so that their uppermost edges 24 are capable when engaged by a pole of preventing the pole from engaging its output under the urging of the member 22 and only one such restricting portion is needed to be in alignment with the path of movement of the pole to prevent the closed position of the pole. On the other hand, if the restrictors are positioned such that a pole does not engage any restricting portion, i.e. it is in alignment with an unrestricting portion in each of the restrictors, it will react to the urging of the member 22 and be free to move to engage its contact. The restrictors $23a$–$23d$ are mounted for linear movement between the solid and dotted line positions shown in FIG. 2, the former being indicated at least for the restrictor $23a$ by the subscript 0 and the latter by 1 in its reference character with each being capable of being moved individually of the others.

With respect to the relative position of the restricting and unrestricting portions of each of the restrictors, they are selected in the specific example given to correspond to the binary relay tree shown in FIG. 1 so that the present selecting mechanism may accept the same electrical commands as the relay tree to produce the same selected output. Thus, referring to FIG. 1, the first stage A in its deenergized position (solid line position shown) enables connection between the input 21 and the outputs 1–8 inclusive while preventing connection between the input 21 and the outputs 9–16 inclusive. Referring to the restrictor $23a$ (FIG. 3), it will be appreciated that in alignment with the poles $1b$–$8b$ there are unrestricting portions while there are restricting portions in alignment with the poles $9b$–$16b$. In the solid line position of the restrictors in FIGS. 2 and 3, the poles $1b$–$8b$ may thus become closed while the poles $9b$–$16b$ cannot become closed. On the other hand if the stage A of FIG. 1 is energized, the outputs 1–8 cannot be connected to the input while the outputs 9–16 may be. Thus if the restrictor $23a$ is moved to its dotted line position $23a_1$, it will be seen that a restricting portion is made to be in alignment with the poles $1b$–$8b$ while an unrestricting portion is made to be in alignment with the poles $9b$–$16b$, the former preventing engagement while the latter permitting same.

Similarly the restrictor $23b$ is shaped to have its restricting and unrestricting portions positioned to conform to the ability of stage B of the relay tree to connect the input to the various outputs. For example, in the solid line position of stage B the input may be connected to the outputs 1–4 and 9–12 inclusive while connection to the output 5–8 and 13–16 inclusive is prevented. Thus the poles $1b$–$4b$ and $9b$–$12b$ are aligned with unrestricting portions of the restrictor $23b$ while poles $5b$–$8b$ and $13b$–$16b$ are aligned with restricting portions. It will be obvious if the restrictor $23b$ is moved leftwardly to the same position as is the restrictor $23a_1$ that the relative abilities of the poles will change as they so change when the stage B is energized. The restrictors $23c$ and $23d$ are also formed with unrestricting and restricting portions in the specific arrangement shown which correspond to the ability of the stages C and D to connect the input to the various outputs.

While the present embodiment may utilize a tertiary system of operation, the tree shown in FIG. 1 is a binary tree and the switching mechanism of the present invention is designed to accept the same electrical commands to provide the same output. Thus the restrictor $23a$ may be considered as being divided into a first half and a second half with the first half having unrestricting portions aligned with the poles $1b$–$8b$ and the second half, restricting portions aligned with the poles $9b$–$16b$. The restrictor $23b$ is effectively divided into four parts with the odd quarter parts having unrestricting portions and the even quarter parts having restricting portions, that is poles $5b$–$8b$ and $13b$–$16b$. The restrictor $23c$ is effectively divided into eighths with odd eighth parts having unrestricting portions and even eighth parts having restricting portions with for example an odd part being aligned with poles $1b$ and $2b$ and an even part with poles $3b$ and $4b$. As to the final restrictor $23d$, every odd pole is aligned with an unrestricting portion while every even pole is aligned with a restricting portion as for example pole $1b$ is aligned with an unrestricting portion and pole $2b$ with a restricting portion. The above description is with the restrictors in the solid line state shown in FIG. 3 which corresponds to the solid line position of the tree of FIG. 1.

With respect to the specific position of the four restrictors shown in their solid line position in FIG. 2 (which corresponds to the unenergized position of the poles in FIG. 1) the output $1a$ is the only output that is connectible to the input when a force is applied by the member 22.

It will be understood that the poles $1b$–$16b$ are spaced apart a common selected distance. The total length of a single restricting and single unrestricting portion, such as shown in restrictor $23a$, is normally equal to the center distance between each of the poles and the portions are preferably each made of the same length while the diameter of the poles is less than the width of an unrestricting portion. Moreover, the movement required to shift a restrictor from one position to another is substantially half the center distance between the poles or the length of an unrestricting portion. It will also be understood that when a change occurs so that an unrestricting part is adjacent a restricting part or vice versa, that a common restricting or unrestricting portion of twice the usual width occurs.

Referring to the remaining figures, there is shown a specific embodiment of the present invention, generally indicated by the reference numeral 30, which is capable of selecting any one of 64 separate outputs. The poles are collectively indicated by the reference numeral 31 and consist of elongate wires having one end 31a fastened or otherwise secured in a bar 32 as by crimping in a slot. An input wire 33 is connected to the bar 32 which is preferably of conudcting material such as copper or aluminum and thus connects the poles 31 in common thereto. A pair of side plates 34 and 35 extend parallel to the poles and support a contact strip 36 to which output wires 37 are connected. The strip 36 is preferably a sheet of insulating material having a conducting coating such as occurs in printed circuit boards with the conducting coating removed in parallel slits to provide individual segments 36a that are electrically isolated from each other. The output wires are secured as by soldering to each of the segments.

A cross piece 38 further extends between the side plates 35 and 36 and supports a plurality of pairs of coils 39a–39f. Each pair of coils is wound about separate legs of a U-shaped core 40 that has a pivotally mounted armature 41 movable between the ends of the core.

Referring specifically to the pair of coils 39a, energization of the coil $39a_1$ will force the armature 41 to its solid line position where it will remain even after deenergization of the coil as there is no other force tending to move it. However, upon energization of the coil $39a_2$, the armature 41 will be attracted to its dotted line position where it also will remain. The other coils 39b–39f are similarly constructed and spaced crosswise of the switching mechanism.

The side plates inbetween the bar 32 and the contact strip 36 support a plurality of restrictors 42. As the quantity of outputs in the herein embodiment is 64, which corresponds to $2^6$, there are accordingly six restrictors 42a–42f. Referring specifically to the restrictor 42a shown in FIG. 7, it is formed of a linear length of relatively thin sheet material, such as plastic or metal, to have the shape shown and specifically to have cutouts 43 and 44 at either end thereof. Also, an armature receiving slot 45 is formed therein on its bottom surface. The upper surface is formed with restricting portions 46 and unrestricting portions 47. The restrictor 42a is positioned in grooves 48 and 49 formed in the side plates to extend transversely beneath the poles 31. In addition the other restrictors 42b–42f are similarly constructed out of a similar material to have cutouts 43 and 44, an armature receiving slot 45 and restricting and unrestricting portions on its upper surface. It will be appreciated that the cutouts 43 and 44 permit limited transverse movement of the restrictors. Moveover, if desired, spacers 50 (FIG. 6) may be positioned between the restrictors to maintain them in spaced apart relation when they are mounted between the side plates provided there is no hindering of their movement.

Referring to the coil pair 39a and the restrictor 42a, it will be understood that the armature 41 is positionable within the slot 45 and that energization of the coil $39a_1$ will force the restrictor rightwardly (FIG. 5) while energization of the coil $39a_2$ will force the restrictor 42a leftwardly. Similarly the armatures of the other coil pairs are positioned within cutouts formed in their associated restrictors. For enabling the assembly of the coils into the mechanism with as compact a width configuration as possible, the restrictors and the coils are spaced not only crosswise of the poles but also longitudinally thereof with the slots 45 of the various restrictors being located to be aligned with their respective armatures.

The leads from the different coils may be connected to a board 51 from which connections 52 may be made, the board having conducting segments as is well known in printed circuit board configurations.

In order to maintain the poles 31 in spaced apart relation, a pair of guides 53 and 54 are positioned on either side of the restrictors to extend between the side plates. The guides limit the sideways movement of the poles while being unrestrictive as to vertical movement.

As shown in FIG. 6, the present switching mechanism is of the type that has all poles open with respect to their outputs and upon energization provides for connection of one of the poles. Thus the poles 31 are made of electrically conducting and yet resilient wire to have an end portion 31b configured as at 31c to define a contact for engagement with its associated segment positioned thereunder. Normally the pole 31 is inherently formed and positioned to have its contact 31c spaced from its associated output segment. For effecting contact of at least the selected pole there is provided an electromagnet 55 having a coil 56 and two core plates 57 and 58. The magnet 55 is positioned to have its core plates 57 and 58 extend beneath the poles transversely thereof and to extend at least under all the poles. Upon energization of the coil 56, all the poles 31 become in the magnetic path associated with the core plates 57 and 58 and are urged theretowards by the magnetc attraction. Thus the poles 31 are formed not only of electrically conducting but also of magnetically attractable material, such as iron.

In the operation of the relay of the present invention with all coils deenergized, not one pole is connected to its output segment. Upon the selection of the desired output the proper coils of the coil assemblies 39a–39f are energized which shifts the restrictors so that only the selected pole is aligned with unrestricting portions. After effecting the positioning of the restrictors, the coil 56 is then energized magnetically attracting all the poles. However, every pole but the selected pole will engage a restricting portion of at least one restrictor and be prevented from having its end 31c deflected to engage its contact. The selected pole will not engage any restricting portion and hence be free to move under the influence of the electromagnet 55 to the dotted line position shown wherein its contact 31c engages its associated contact plate. A connection is thus made through the input 33 to the one output 37 which corresponds to the selected pole.

The restricting and unrestricting portions of the restrictors 42 have their relative disposition on each of the restrictors determined in the same manner as that explained in connection with the 16 output selector switching mechanism disclosed in FIGS. 2 and 3. Thus the restrictor 42a has its first half part of unrestricting portions and its remaining half of restricting portions; the restrictor 43b has first and third quarters of unrestricting portions and second and fourth quarters of restricting portions; the restrictor 42c has odd eighth parts of unrestricting and even eighth parts of restricting portions; the restrictor 42d has odd sixteenth parts made of unrestricting portions and even sixteenth parts of restricted portions; the restrictor 43e has odd thirty-secondth parts of unrestricting portions and even thirty-secondth parts restricting portions and the restrictor 42f has odd sixty-fourth parts of unrestricting portions and even sixty-fourth parts of restricting portions.

As in the previously described embodiment the total width of a restricting portion and an unrestricting portion of normal length is equal to the center distance transversely between adjacent poles. The movement of the restrictors is one-half the center distance between the poles and equal to the width of an unrestricting portion, which may be les than half the center distance but greater than the diameter of a pole.

Shown in FIG. 8 is an electrical schematic diagram of a manner in which the selector mechanism may be interconnected. The coil pairs 39a–39f are shown connected to a common ground 59 and each coil is connected to a contact a single pole double throw switch 60a–60f through connections 52. The switches are connected in parallel to a contact of a single pole double throw switch 61 that is connected to the terminal of the positive source. Initially the switch 61 is thrown to connect the switches 60a–60f to the source and any one or all of the switches 60a–60f may be actuated according to the binary representation of the decimal number of the selected output. If a switch is not operated it will cause its associated coil pair to assume a 0 state (comparable to the unenergized state of the coil of the relay tree in FIG. 1) and if operated from its solid line position to cause its coil pair to assume a 1 state (an energized state of a coil of the relay tree). The energization of the different coil pairs will cause the restrictors to simultaneously move to the position dictated by the said energization. After selecting, the switch 61 is operated to disconnect the switches 60a–60f from the source and connect the electromagnet 55 thereto. This energizes the electromagnet to urge the poles to engage their segments but only the selected pole will become so engaged. The electromagnet is maintained energized for as long as it is desired to have contact of the pole with its cessation occurring with the cessation of energization of the electromagnet 55. The pole making contact may be deflected sufficiently to effect physical touching of the plates 57 and 58, through preferably it does not while the other restricted poles do not touch the plates.

While the above described operation is effectively a manual operation, it will be understood that other and different circuits may operate the relay. One utilization is shown in U.S. Pat. No. 3,328,533 wherein the present selector switching mechanism may replace a binary relay tree in a telephone system.

Though the specific embodiment herein described enables selection merely by a short energization of each coil in a coil pair, if it is desired to use a spring in place of one coil as in conventional relays, then the energization must be maintained to have the restrictor kept in its spring opposed position. Additionally, while the normal position of the poles is described as providing an open connection with the outputs, if desired the normal position of the poles may be closed and achieved simply by for example placing the contact strip above the ends of the poles so that downward movement of the pole effects a separation of the selected pole and its associated contact.

The electromagnet 55 must have sufficient strength to attract all the poles downwardly a distance which causes all but one of them to engage the restrictors. The one that does not engage a restrictor is attracted with an even greater force as it bends and becomes closer to the plates 57 and 58. This additional force on the selected pole has been found to be exceedingly advantageous as it will insure a good contact force between the selected pole and the output. Thus the magnet 55 is not required to be of a strength which would be required if all poles had to have the same attracting force that would insure good contact.

Though a binary coded restriction means has been disclosed because use is made of binary representation in the electrical commands in selecting the output, other codes and representations may be employed if desired with different electrical commands.

It will accordingly be appreciated that there has been disclosed a selector switching mechanism which enables the selection of any one of a plurality of outputs in response to an electrical command. The mechanism is rendered exceedingly simple and economical in construction by the use of a plurality of poles, one for each output and restriction means which permit only the selected pole to alter its relationship with its output. The selection is achieved by the use of individually movable restrictors which have restricting portions and unrestricting portions with any position of the restrictors permitting only one pole to engage its output by being aligned with unrestricted portions while the other poles engage one or more restricting portions.

Variations and modifications may be made within the scope of the claims and portions of the improvements may be used without others.

I claim:
1. An electric selector switching mechanism for electrically connecting an electrical input to one but not all of a plurality of electrical outputs comprising an electrical input, a plurality of individually isolated electrical outputs, a plurality of elongate poles with each having a contact portion, means electrically connecting the poles to the input and supporting the contact portion of the poles adjacent the outputs, said poles and ouputs being relatively supported and positioned to enable each pole to engage only one output to be electrically connected thereto, means for normally maintaining all of the poles in one state of engagement with the outputs to thereby maintain the input electrically isolated from all of the outputs, means for relatively moving the poles into the other state of engagement with the outputs to form an electrical connection therebetween, restriction means positioned in the path of movement of the poles and including a plurality of restrictors with each restrictor having for each pole either a restricting portion which prevents movement of the pole to its other state or an unrestricting portion which enables the pole to attain its other state and means for shifting the relative positions of the poles and restriction means in accordance with an electrical signal, said shifting means including means for shifting each restrictor independently of the others to thereby cause each restrictor to have an unrestricting portion in the path of movement of at least one pole but not all to enable said pole when moved by the pole moving means to attain its other state whereby it electrically connects the input to the output engaged by the pole.

2. The invention as defined in claim 1 in which the means for moving the poles is normally inactive and in which the means for relatively shifting the poles and restriction means occurs while the moving means is inactive.

3. The invention as defined in claim 1 in which the poles are mounted in spaced apart relationship with a preselected distance therebetween and in which at least some of the restricting portions and unrestricting portions have a width that is less than the said preselected distance whereby the relative shifting positions said restricting portions between poles or aligned with a pole.

4. The invention as defined in claim 3 in which the means for relatively shifting the restriction means and poles effects relative movement thereof a distance which is less than the preselected distance.

5. The invention as defined in claim 1 in which the restrictors are shiftable between two positions and the restrictor shifting means is responsive to an electrical command for shifting the restrictors to one position or the other.

6. The invention as defined in claim 1 in which there is one restrictor for each power of two which numerically at least equals the number of poles.

7. The invention as defined in claim 1 in which each restrictor has restricting and unrestricting portions, with each restrictor having a different combination thereof.

8. The invention as defined in claim 7 in which a first restrictor has a first half consisting of unrestricting portions and a second half consisting of restricting portions; in which a second restrictor has odd quarter parts consisting of unrestricting portions and even quarter parts consisting of restricting portions; in which a third restrictor has odd eighth parts consisting of unrestricting portions and even eighth parts consisting of restricting portions and in which a fourth restrictor has odd sixteenth parts consisting of unrestricting portions and even sixteenth parts consisting of restricting portions.

9. The invention as defined in claim 1 in which the poles are formed of paramagnetic material and the means for moving include an electromagnet which produces a magnetic field that moves all poles.

10. The invention as defined in claim 1 in which the poles consist of elongate wires cantileverly supported at one end, said contact means being formed on the other end, and said moving means is positioned to bend said poles about their support.

11. The invention as defined in claim 1 in which the means for moving the poles moves all the poles a distance which will in the absence of a pole engaging a restricting portion cause the poles to attain their other state.

References Cited

UNITED STATES PATENTS

| | | | |
|---|---|---|---|
| 1,639,901 | 8/1927 | Sampson | 335—128 |
| 2,950,368 | 8/1960 | Londell | 200—1 X |
| 3,125,672 | 3/1964 | Kull | 200—46 X |
| 3,301,025 | 1/1967 | Gruner | 200—46 X |
| 3,425,010 | 1/1969 | Klann | 200—46 X |
| 3,439,133 | 4/1969 | Vaccaro et al. | 200—1 |

ROBERT K. SCHAEFER, Primary Examiner

R. A. VANDERHYE, Assistant Examiner

U.S. Cl. X.R.

200—1, 46, 175